United States Patent
Kim et al.

(10) Patent No.: US 9,531,220 B2
(45) Date of Patent: Dec. 27, 2016

(54) MOTOR AND WASHING MACHINE HAVING THE SAME

(75) Inventors: Young Kwan Kim, Anyang-si (KR); Keun Young Yoon, Osan-si (KR); Woong Hwang, Suwon-si (KR); Byung Ryel In, Yongin-si (KR); Sung Gu Lee, Gunpo-si (KR); Su Kwon Jeong, Suwon-si (KR); Myung Bae Bang, Pyeongtaek-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 876 days.

(21) Appl. No.: 13/608,201

(22) Filed: Sep. 10, 2012

(65) Prior Publication Data

US 2013/0061640 A1  Mar. 14, 2013

(30) Foreign Application Priority Data

Sep. 8, 2011  (KR) .......................... 10-2011-0091004

(51) Int. Cl.
*H02K 1/30* (2006.01)
*H02K 1/14* (2006.01)
(Continued)

(52) U.S. Cl.
CPC ............ *H02K 1/148* (2013.01); *H02K 1/2773* (2013.01); *H02K 1/30* (2013.01); *H02K 15/10* (2013.01)

(58) Field of Classification Search
CPC ........ H02K 1/30; H02K 1/148; H02K 1/2773; H02K 15/10; H02K 21/22
(Continued)

(56) References Cited

U.S. PATENT DOCUMENTS

| 3,979,821 A | * | 9/1976 | Noodleman | ......... H02K 13/006 148/108 |
| 5,200,662 A | * | 4/1993 | Tagami | ................ H02K 1/2773 310/114 |

(Continued)

FOREIGN PATENT DOCUMENTS

| JP | 2009-77602 | 4/2009 |
| KR | 10-0644836 | 3/2006 |

OTHER PUBLICATIONS

Chinese Office Action dated Sep. 6, 2016 from Chinese Patent Application No. 201210332756.7, 4 pages.

*Primary Examiner* — John K Kim
(74) *Attorney, Agent, or Firm* — Staas & Halsey LLP (57) ABSTRACT

A motor having a structure capable of achieving an enhancement in durability and a washing machine, to which the motor is applied. The motor includes a stator including a plurality of stator cores arranged in a circumferential direction, and coils respectively wound around the stator cores, and a rotor rotatably arranged inside or outside the stator. The rotor includes a plurality of rotor cores arranged in a circumferential direction of the rotor, a plurality of magnets each disposed between neighboring ones of the rotor cores, a molded body having a bridge to support the plurality of rotor cores and the plurality of magnets, and a coupler including coupling ribs outwardly extending from an outer circumferential surface of the bridge in a radial direction of the rotor, and coupling grooves formed at inner ends of the rotor cores supported by the bridge, to receive the coupling ribs, respectively.

8 Claims, 9 Drawing Sheets

(51) Int. Cl.
*H02K 1/27* (2006.01)
*H02K 15/10* (2006.01)

(58) Field of Classification Search
USPC .................. 310/43, 156.19, 156.23, 156.48,
216.008, 310/216.009
IPC ...................................................... H02K 1/30
See application file for complete search history.

(56) References Cited

U.S. PATENT DOCUMENTS

| | | | | |
|---|---|---|---|---|
| 6,847,145 B2* | 1/2005 | Van Dine | ............... | H02K 15/03 310/156.48 |
| 7,148,598 B2* | 12/2006 | Ionel | ................... | H02K 1/2773 29/598 |
| 7,923,879 B2* | 4/2011 | Nitta | ................... | H02K 1/2786 310/156.44 |
| 8,354,766 B2* | 1/2013 | Maekawa | ............. | D06F 37/206 310/156.43 |
| 8,739,581 B2* | 6/2014 | Shiga | ................... | D06F 37/304 310/152 |
| 8,766,508 B2* | 7/2014 | Park | ..................... | H02K 1/2773 310/156.19 |
| 2005/0047891 A1* | 3/2005 | Toyooka | ............. | F16B 23/0023 411/403 |
| 2005/0088052 A1* | 4/2005 | Ionel | ................... | H02K 1/2773 310/156.09 |
| 2008/0152460 A1* | 6/2008 | Watanabe | ................ | F16B 5/02 411/412 |
| 2010/0277028 A1* | 11/2010 | Alexander | ........... | H02K 1/2773 310/156.51 |
| 2013/0061640 A1* | 3/2013 | Kim | ...................... | H02K 1/148 68/140 |

* cited by examiner

MOTOR AND WASHING MACHINE HAVING THE SAME

CROSS-REFERENCE TO RELATED APPLICATIONS

This application claims the benefit of Korean Patent Application No. 10-2011-91004, filed on Sep. 8, 2011 in the Korean Intellectual Property Office, the disclosure of which is incorporated herein by reference.

BACKGROUND

1. Field

Embodiments of the present disclosure relate to a motor having an improved structure capable of achieving an enhancement in durability 2. Description of the Related Art A motor is a machine to produce rotating force from electrical energy. Such a motor includes a stator and a rotor. The rotor is configured to co-operate with the stator in an electromagnetic manner. The rotor is rotated by a force exerted between a magnetic filed and current flowing through a coil.

Permanent magnet motors, which use permanent magnets to generate an electric field, may be classified into a surface mounted permanent magnet motor, an interior type permanent magnet motor, and a spoke type permanent magnet motor.

The spoke type permanent magnet motor may generate high power with high torque in that it exhibits high magnetic flux concentration. The spoke type permanent magnet motor may also be advantageous in that it may be miniaturized, as compared to other types of motors, for the same output power. The spoke type permanent magnet motor may be applied to drive motors for washing machines or electric vehicles, which require high power with high torque.

Generally, the rotor of the spoke type permanent magnet motor includes permanent magnets arranged about a rotating shaft in a radial manner, and rotor cores each arranged between adjacent ones of the permanent magnets.

In such a spoke type permanent magnet motor, the rotor cores are arranged in a circumferential direction of the rotor in a divided state in order to avoid magnetic flux leakage in an axial direction of the motor. The divided rotor cores are coupled by a molded body in an insert molding process. However, the molded body, which has relatively low strength, as compared to the rotor cores, may be damaged during rotation of the rotor at high speed. As a result, the rotor cores may be separated from the rotor.

SUMMARY

Therefore, it is an aspect of the present disclosure to provide a motor having an improved structure capable of achieving an enhancement in durability, and a washing machine, to which the motor is applied.

Additional aspects of the disclosure will be set forth in part in the description which follows and, in part, will be apparent from the description, or may be learned by practice of the disclosure.

In accordance with one aspect of the present disclosure, a motor includes a stator including a plurality of stator cores arranged in a circumferential direction, and coils respectively wound around the stator cores, and a rotor rotatably arranged inside or outside the stator, wherein the rotor includes a plurality of rotor cores arranged in a circumferential direction of the rotor, a plurality of magnets each disposed between neighboring ones of the rotor cores, a molded body having a bridge to support the plurality of rotor cores and the plurality of magnets, and a coupler including coupling ribs outwardly extending from an outer circumferential surface of the bridge in a radial direction of the rotor, and coupling grooves formed at inner ends of the rotor cores supported by the bridge, to receive the coupling ribs, respectively.

Each of the coupling ribs may include a first inclined protrusion inclinedly extending from the outer circumferential surface of the bridge while having a gradually-decreasing circumferential width, and a second inclined protrusion inclinedly extending from the first inclined protrusion while having a gradually-increasing circumferential width.

Each of the coupling grooves may include a first groove portion to receive the first inclined protrusion of a corresponding one of the coupling ribs, and a second groove portion connected to the first groove portion, to receive the second inclined protrusion of the corresponding coupling rib.

Each of the coupling grooves may be centrally formed at the inner end of a corresponding one of the rotor cores.

Each of the rotor cores may further include a separation preventing hole, through which a portion of the molded body extends such that the molded body is coupled to the rotor core, to prevent the rotor from being separated by centrifugal force during rotation of the rotor.

The separation preventing hole may have a diameter of about 1.5 to 5 mm.

Each of the magnets may extend in an axial direction of the rotor outwardly of upper and lower surfaces of the neighboring rotor cores, between which the magnet is disposed.

Each of the rotor cores may further include first protrusions respectively extending in the circumferential direction of the rotor from opposite side surfaces of the rotor core contacting corresponding ones of the magnets. Facing ones of the first protrusions of the neighboring rotor cores may contact one end of the magnet disposed between the neighboring rotor cores, to determine a position of the magnet in a direction in which a radius of the rotor increases.

Each of the rotor cores may further include second protrusions formed at an outer end of the rotor core defining a clearance, along with one end of a corresponding one of the stator cores, such that each of the second protrusions is disposed at a position farther from a center of the rotor than a corresponding one of the first protrusions. Each of the second protrusions may have an inclined surface to form an inclination angle with respect to the surface of the rotor core, from which the second protrusion extends, while extending in a direction farther from the center of the rotor.

Facing ones of the second protrusions of the neighboring rotor cores may have a narrower spacing than a spacing between the first protrusions corresponding to the facing second protrusions.

In accordance with another aspect of the present disclosure, a washing machine includes a body, a tub disposed within the body, to store washing water, a drum disposed within the tub such that the drum is rotatably supported by the tub via a drive shaft, and a motor mounted to the tub, to rotate the drive shaft, wherein the motor includes a stator including a circular body having an inner circumferential surface and an outer circumferential surface, stator cores inwardly extending from the body in a radial direction, and coils respectively wound around the stator cores, a rotor to co-operate with the stator in an electromagnetic manner such that the rotor rotates, the rotor including a plurality of magnets arranged in a circumferential direction of the rotor, and a plurality of rotor cores arranged in a circumferential direction of the rotor such that the rotor cores alternate with the magnets, to concentrate magnetic flux formed at the magnets on the rotor cores, and a molded body including first coupling ribs each coupled to an inner end of a corresponding one of the rotor cores, and second coupling ribs each coupled not only to facing side surfaces of neighboring ones of the rotor cores, between which a corresponding one of the magnets is disposed, but also to an end of the corresponding magnet disposed adjacent to the stator cores.

The rotor may further include through holes respectively extending through the rotor cores. The molded body may further include third coupling ribs respectively coupled to inner surfaces of the through holes.

The molded body may include a circular bridge coupled to the rotor cores. Each of the first coupling ribs may extend from an outer circumferential surface of the bridge in a direction that a radius of the bridge increases, and may be provided, at an end thereof, with an engagement portion to prevent the corresponding rotor core from being separated from the bridge during rotation of the rotor.

The rotor core may be provided, at an inner end thereof, with a coupling groove to receive the first coupling rib.

The plurality of rotor cores and the plurality of magnets may be inserted into a mold for injection molding of the molded body. Each of the first coupling ribs may be formed to have a shape corresponding to the corresponding coupling groove during injection molding of the molded body. Each of the second coupling ribs may be formed to have a shape corresponding to a space defined by the facing side surfaces of the neighboring rotor cores corresponding to the second coupling rib and one end of the magnet disposed between the neighboring rotor cores while being disposed adjacent to the stator cores, during injection molding of the molded body. Each of the third coupling ribs may be formed to have a shape corresponding to the corresponding through hole during injection molding of the molded body.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described with reference to the accompanying drawings. Motors according to respective embodiments of the present disclosure may be applied to various appliances such as a washing machine, an air conditioner, an electric vehicle, a light rail transit train, an electric bicycle, a small electric generator, each of which uses a motor as a power source.

Figure 1:
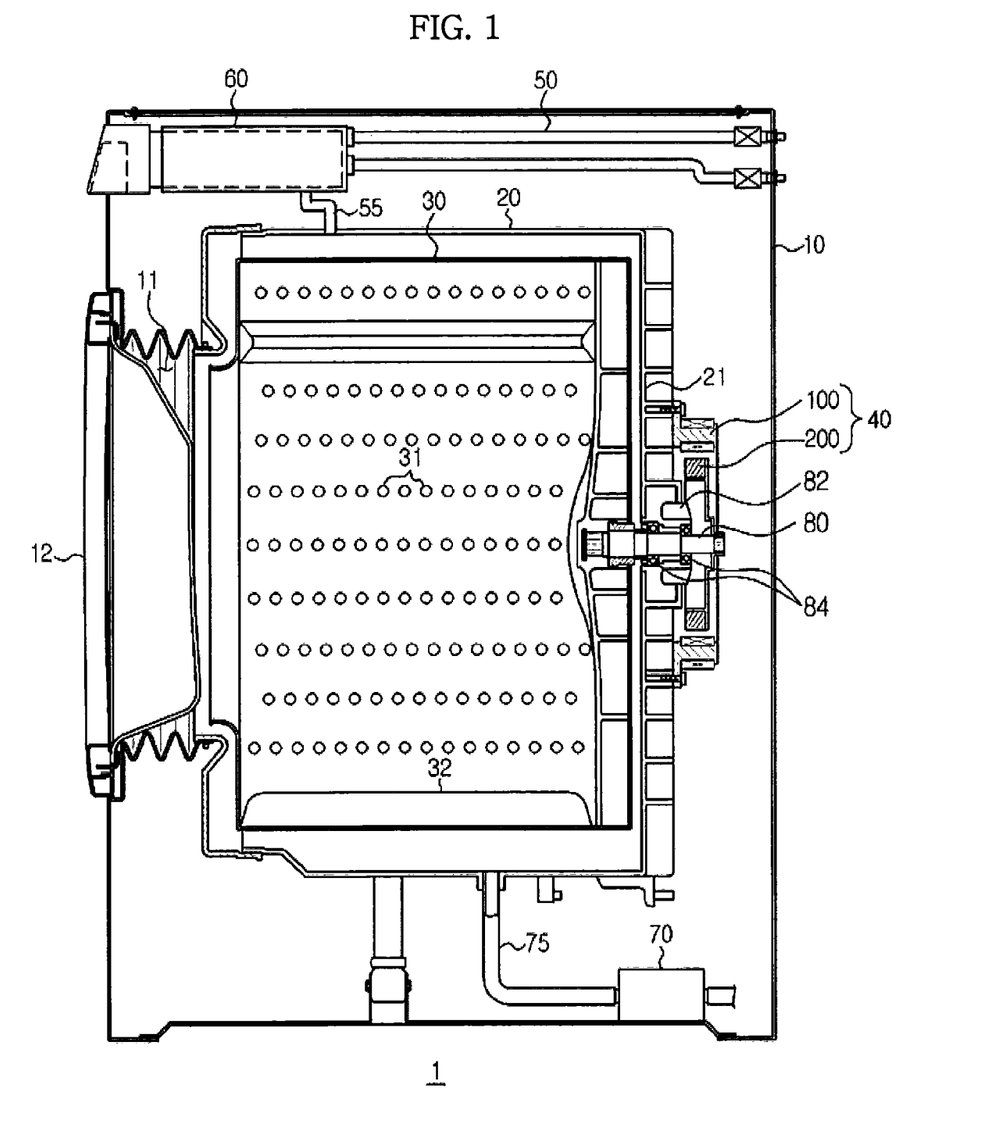
FIG. 1 is a washing machine according to an exemplary embodiment of the present disclosure.

FIG. 1 is a washing machine according to an exemplary embodiment of the present disclosure.

As shown in FIG. 1, the washing machine, which is designated by reference numeral "1", includes a cabinet 10 to form an outer appearance of the washing machine, a tub 20 disposed within the cabinet 10, a drum 30 rotatably disposed within the tub 20, and a motor 40 to drive the drum 30.

A loading opening 11 is formed at a front wall of the cabinet 10, to allow loading of laundry into the drum 30. The loading opening 11 is opened or closed by a door 12 installed at the front wall of the cabinet 10.

A water supply tube 50 is installed over the tub 20, to supply washing water to the tub 20. The water supply tube 50 is connected, at one side thereof, to an external water supply source (not shown). The water supply tube 50 is also connected, at the other side thereof, to a detergent supplier 60. The detergent supplier 60 is connected to the tub 20 via a connecting tube 55. Water supplied through the water supply tube 50 is supplied to the interior of the tub 20, along with detergent, via the detergent supplier 60.

A drainage pump 70 and a drainage tube 75 are installed beneath the tub 20, to drain water from the interior of the tub 20.

A plurality of through holes 31 are formed through a peripheral wall of the drum 30, for flow of washing water. Lifters 32 are installed on an inner surface of the peripheral wall of the drum 30, to allow tumbling of laundry during rotation of the drum 30.

A drive shaft 80 is disposed between the drum 30 and the motor 40. The drive shaft 80 transmits rotation force from the motor 40 to the drum 30. The drive shaft 80 is connected, at one end thereof, to the drum 30 while extending, at the other end thereof, outwardly of the tub 20 after passing through a rear wall 21 of the tub 20.

A bearing housing 82 is installed at the rear wall 21 of the tub 20, to rotatably support the drive shaft 80. The bearing housing 82 may be made of an aluminum alloy. When the tub 20 is injection-molded, the bearing housing 82 may be inserted into the rear wall 21 of the tub 20. Bearings 84 are installed between the bearing housing 82 and the drive shaft 80, to allow the drive shaft 80 to rotate smoothly.

Figure 2:
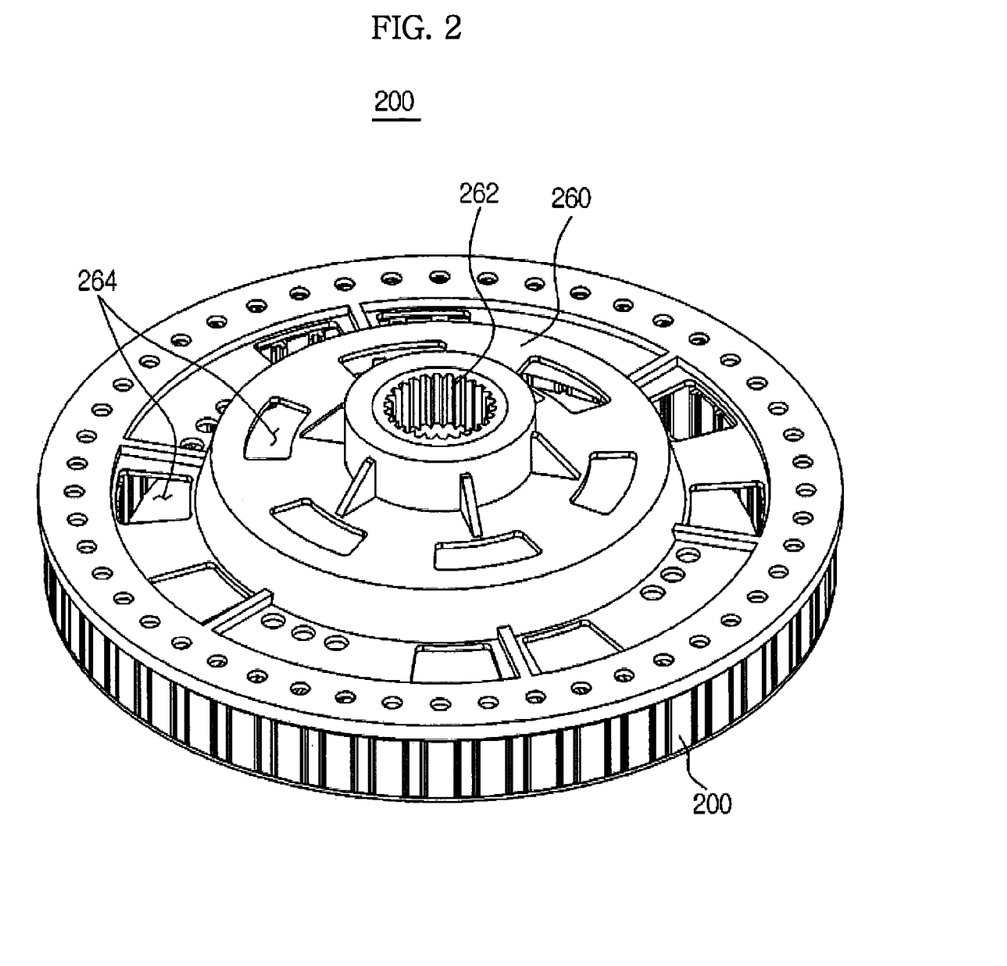
FIG. 2 is a perspective view illustrating a rotor included in the motor according to the illustrated embodiment of the present disclosure.
Figure 3:
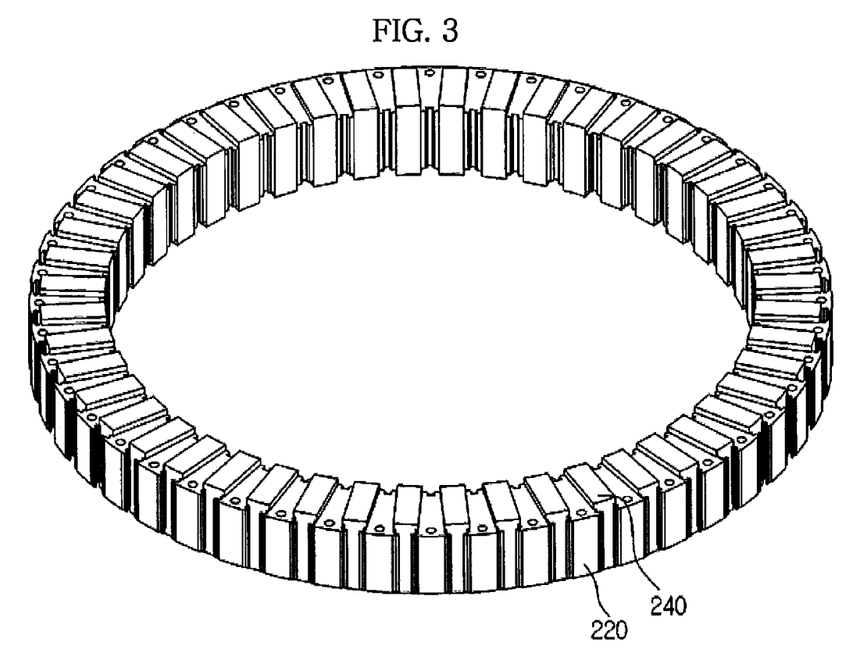
FIG. 3 is a perspective view illustrating rotor cores and magnets in a state of being separated from the structure of FIG. 1.
Figure 4:
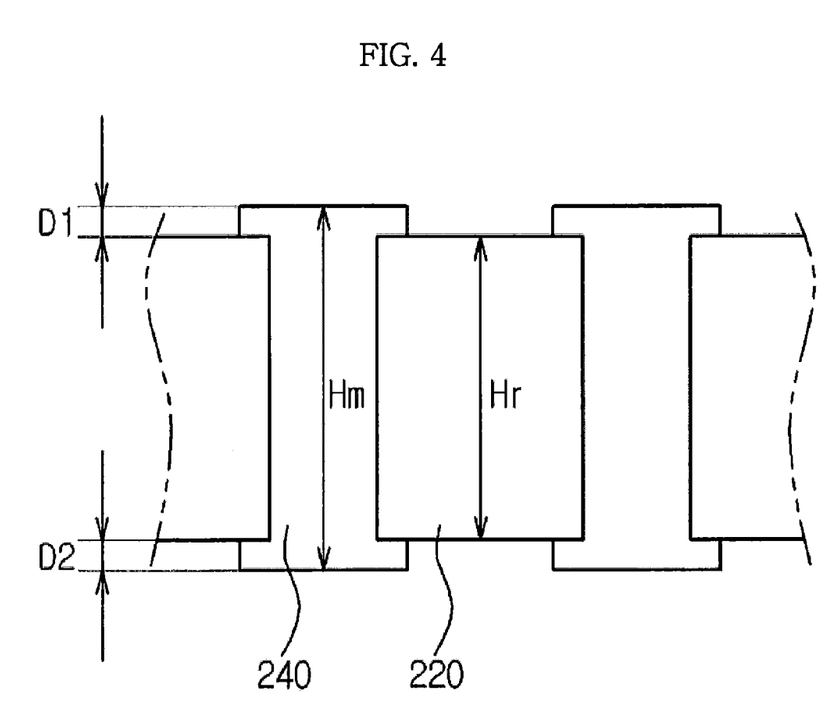
FIG. 4 is an enlarged front view illustrating a portion of FIG. 3.
Figure 5:
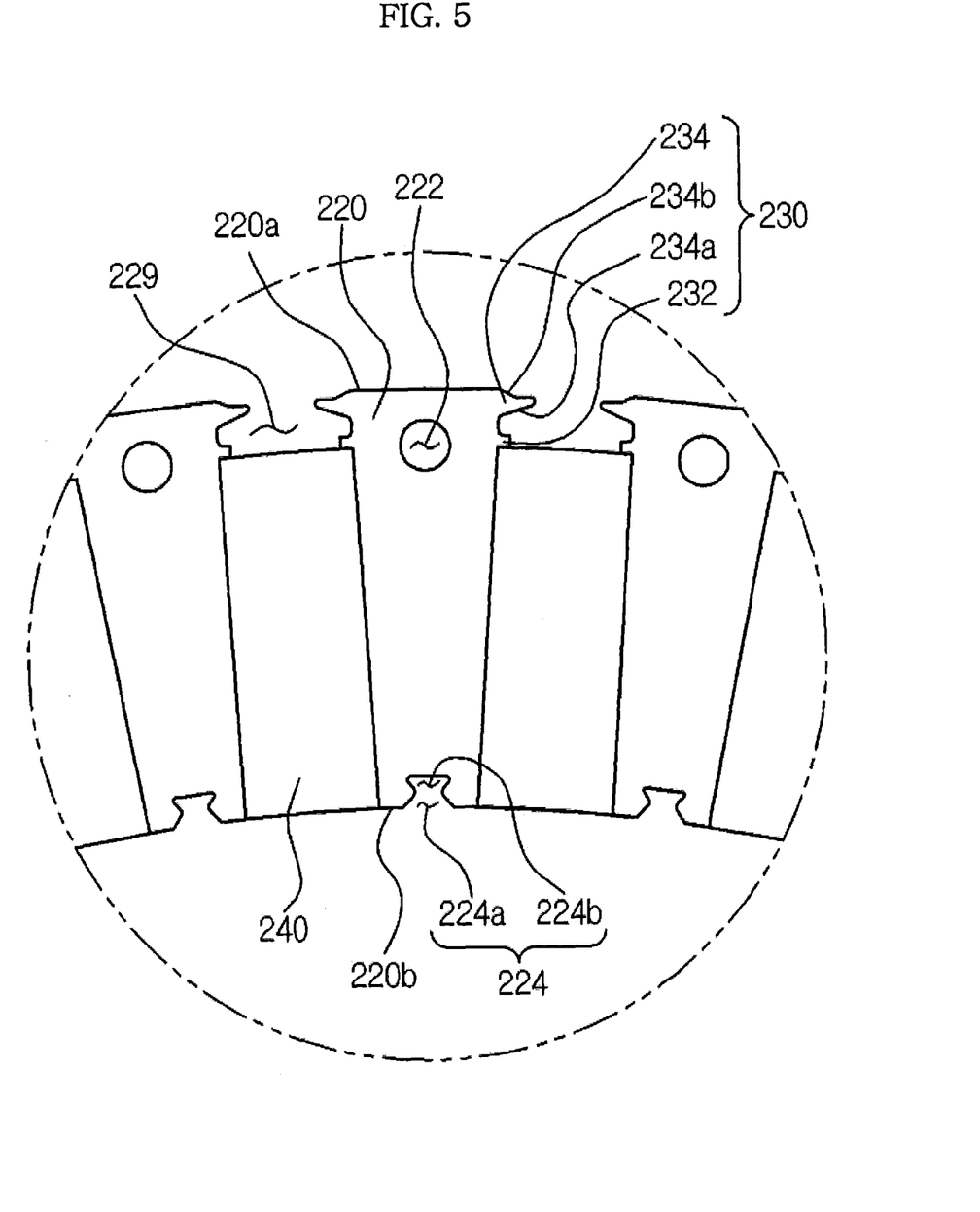
FIG. 5 is an enlarged plan view illustrating a portion of FIG. 3.
Figure 6:
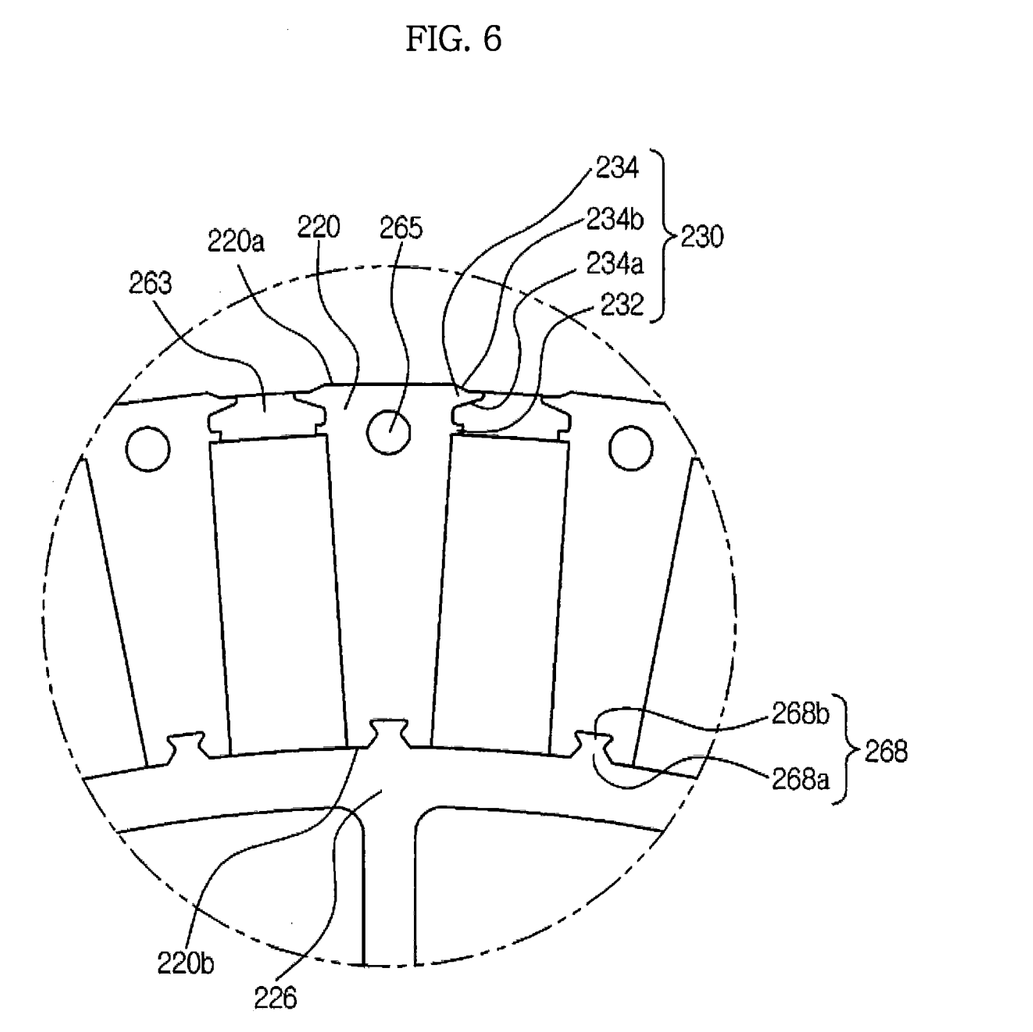
FIG. 6 is a view illustrating a state in which a molded body is coupled to the rotor cores and magnets shown in FIG. 5.

FIG. 2 is a perspective view illustrating a rotor included in the motor according to the illustrated embodiment of the present disclosure. FIG. 3 is a perspective view illustrating rotor cores and magnets in a state of being separated from the structure of FIG. 1. FIG. 4 is an enlarged front view illustrating a portion of FIG. 3. FIG. 5 is an enlarged plan view illustrating a portion of FIG. 3. FIG. 6 is a view illustrating a state in which a molded body is coupled to the rotor cores and magnets shown in FIG. 5. The motor according to the illustrated embodiment of the present disclosure may be of an inner rotor type, in which the rotor is arranged inside a stator, or of an outer rotor type, in which the rotor is arranged outside the stator. For convenience of description, the following description will be given in conjunction with the inner rotor type motor.

As shown in FIGS. 1 to 6, the motor 40 is disposed outside the tub 20. The motor 40 supplies power to the drum 30, to rotate the drum 30 in opposite directions. The motor 40 includes a stator 100 mounted to the rear wall 21 of the tub 20, and a rotor 200 disposed around the stator 100, to co-operate with the stator 100 in an electromagnetic manner such that the rotor 200 rotates.

The rotor 200 includes a plurality of rotor cores 220 arranged in a radial manner, a plurality of magnets 240 each disposed between neighboring ones of the rotor cores 220, and a molded body 260 to support the plural rotor cores 220 and the plural magnets 240.

The rotor cores 220 support the magnets 240 while establishing magnetic paths for magnetic flux formed at the magnets 240. The rotor cores 220 are arranged in a circumferential direction of the rotor 200 while being spaced apart from one another, to receive each magnet 240 between the corresponding neighboring rotor cores 220.

Each rotor core 220 includes an inner end 220b disposed adjacent to a center of the rotor 200, and an outer end 220a disposed adjacent to a stator core 114 facing the rotor core 220 while defining a clearance, along with the stator core 114. Each rotor core 220 has a circumferential width gradually increasing as the rotor core 220 extends from the inner end 220b thereof to the outer end 220a thereof. The rotor cores 220 may be formed by stacking plate members, which are prepared by pressing a silicon steel plate. Although a plurality of stator cores 114 is provided, the following description will be given only in conjunction with one stator core 114, for convenience of description.

Each rotor core 220 also includes a demagnetization preventer 230 to prevent occurrence of a phenomenon in which magnetic flux generated from the stator core 114 during rotation of the rotor 200 through electromagnetic co-operation of the rotor 200 with the stator 100 influences a corresponding one of the magnets 240 respectively contacting opposite side surfaces of the rotor core.

The demagnetization preventer 230 of each rotor core 220 includes a first demagnetization preventing protrusion 232 extending from the side surface of the rotor core 220 contacting the corresponding magnet 240 in the circumferential direction of the rotor 200, and a second demagnetization preventing protrusion 234 disposed at a position farther from the center of the rotor 200 than the first demagnetization preventing protrusion 232 while extending from the side surface of the rotor core 220 in the circumferential direction of the rotor 200. In the illustrated case, the second demagnetization preventing protrusion 234 is provided at the outer end 220a of the rotor core 220.

The facing first demagnetization preventing protrusions 232 of the neighboring rotor cores 220 contact one end of the magnet 240 interposed between the rotor cores 220, to determine the position of the magnet 240. The facing first magnetization preventing protrusions 232 also regulate the radial clearance between the magnet 240 and the stator core 114.

The facing first demagnetization preventing protrusions 232 prevent occurrence of a phenomenon in which magnetic flux generated from the stator core 114 during rotation of the rotor 200 through electromagnetic co-operation of the rotor 200 with the stator 100 influences magnetic flux formed at the corresponding magnet 240, thereby reducing the intensity of the magnetic flux formed at the magnet 240, namely, a demagnetization phenomenon, by regulating the clearance between magnet 240 and the stator core 114 such that the magnet 240 is prevented from being excessively close to the stator core 114.

The facing first demagnetization preventing protrusions 232, which extend from the facing side surfaces of the neighboring rotor cores 220, respectively, reduce the spacing between the neighboring rotor cores 220. That is, the first demagnetization preventing protrusions 232 guide magnetic flux generated from the stator core 114 to easily establish a magnetic flux path through the first demagnetization preventing protrusions 232 without influencing the magnetic flux formed at the corresponding magnet 240.

The second demagnetization preventing protrusions 234 respectively provided at the outer ends 220a of the neighboring rotor cores 220 while facing each other regulate the circumferential spacing between the neighboring rotor cores 220.

The facing second demagnetization preventing protrusions 234, which extend in opposite directions from respective outer ends 220a of the neighboring rotor cores 220, guide magnetic flux generated from the stator core 114 to easily establish a magnetic flux path through the second demagnetization preventing protrusions 234 without influencing the magnetic flux formed at the corresponding magnet 240, by regulating the spacing between the neighboring rotor cores 220.

Each second demagnetization preventing protrusion 234 may have a first inclined surface 234a and a second inclined surface 234b. The first and second inclined surfaces 234a and 234b form inclination angles with respect to the surface of the corresponding rotor core 220, from which the second demagnetization preventing protrusion 234 extends, while extending in a direction farther from the center of the rotor 200. The first inclined surface 234a guides magnetic flux generated from the stator core 114 to easily establish a magnetic flux path, along with the outer end 220a of the rotor core 220 positioned adjacent to the stator core 114, and thus to prevent the magnetic flux from influencing the corresponding magnet 240 via the second demagnetization preventing protrusion 234. The second inclined surface 234b disperses dense magnetic flux formed between the clearance between the corresponding rotor core 220 and the stator core 114 at the outer end of the rotor core 220, to reduce vibration of the stator 100 or rotor 200 generated due to electromagnetic excitation force caused by magnetic flux or noise generated due to such vibration.

Each rotor core 220 also includes a through hole 222 and a coupling groove 224, which are coupled to the molded body 260 supporting the separated rotor cores 220.

The through hole 222 extends through the rotor core 220, to receive a portion of the molded body 260 during injection molding of the molded body 260, and thus to be coupled to the molded body 260.

The through hole 222 may have a diameter of 1.5 to 5 mm. When the diameter of the through hole 222 is excessively small, the rotor core 220 may not be firmly supported by the molded body 260. On the other hand, when the through hole 222 has an excessively-large diameter, magnetic flux concentrated on the rotor core 220 may interfere with establishment of a magnetic flux path through the outer end 220a of the rotor core 220.

Each rotor core 220 may have a plurality of through holes 222 arranged in a radial direction of the rotor 200. When the number of through holes 222 is excessive, magnetic flux concentrated on the rotor core 220 may interfere with establishment of a magnetic flux path through the outer end 220a of the rotor core 220, as in the case in which the rotor core 220 has an excessively-large through hole 220. Accordingly, the number of through holes 222 may be 3 or less.

The coupling groove 224 is substantially centrally formed at the inner end 220b of the rotor core 220. The coupling groove 224 includes a first groove portion 224a shaped to have a circumferential width gradually decreasing in a direction from the inner end 220b to the outer end 220a, and a second groove portion 224b connected to the first groove portion 224a, and shaped to have a circumferential width gradually increasing in the direction from the inner end 220b to the outer end 220a.

The first and second groove portions 224a and 224b receive a portion of the molded body 260 during injection molding of the molded body 260, and thus to cause the rotor core 220 to be firmly coupled to the molded body 260.

The plural magnets 240, each of which is disposed between the neighboring rotor cores 220, are arranged in the circumferential direction of the rotor 200 such that they are disposed in a radial manner about the center of the rotor 200. The magnets 240 may be ferrite magnets or magnets containing a rare earth material such as neodymium or samarium, which may semi-permanently maintain magnetic properties of high energy density.

The magnetic flux formed at the magnets 240 is arranged in the circumferential direction of the rotor 200. Neighboring ones of the magnets 240 are disposed such that the same poles thereof face each other. In accordance with a magnetic circuit established by the above-described magnet arrangement, it may be possible to concentrate magnetic flux generated from the magnets 240, and thus to achieve an enhancement in performance while reducing motor size.

As shown in FIG. 4; each magnet 240 may have a length Hm longer than a length Hr of the rotor core 220 in an axial direction of the rotor 200 such that the magnet 240 extends in the axial direction of the rotor 200 outwardly of upper and lower surfaces of the rotor core 220 when viewed in FIG. 4.

Magnetic flux formed at the magnets 240 coupled to opposite sides of each rotor core 220 is concentrated on the rotor core 220. A large portion of the magnetic flux concentrated on the rotor core 220 establishes a magnetic flux path through the outer end 220a of the rotor core 220 in a direction that the radius of the rotor 200 increases, thereby causing the rotor 200 to rotate.

A portion of the magnetic flux concentrated on one of the neighboring rotor cores 220 may leak through the upper and lower surfaces of the rotor core 220, and may establish a magnetic flux leakage path, along with magnetic flux leaking through the upper and lower surfaces of the other one of the neighboring rotor cores 220. Such magnetic flux leakage may increase when the magnetic flux leakage path thereof is shortened. To this end, each magnet 240 may extend in the axial direction of the rotor 200 outwardly of upper and lower surfaces of the corresponding rotor cores 220, to increase the length of the magnetic flux leakage path. In this case, accordingly, it may be possible to reduce magnetic flux leakage from the rotor cores 220. Also, the magnetic flux concentrated on each rotor core 220 may concentratively function to establish a magnetic flux path in the direction that the radius of the rotor 200 increases. Thus, the output power and efficiency of the motor may be maintained at desired levels or more.

Respective extension lengths of the magnet 240 from the upper and lower surfaces of each corresponding rotor core 220 in the axial direction of the rotor 200, namely, d1 and d2, may be 0.5 to 5 mm. When the extension length d1 or d2 is less than 0.5 mm, it may be substantially difficult to obtain an effect of reducing magnetic flux leakage. On the other hand, when the extension length d1 or d2 exceeds 5 mm, the magnetic flux formed at the magnet 240 may be incompletely concentrated on the rotor core 220.

The molded body 260 includes an annular bridge 226 to support the plural rotor cores 220 and plural magnets 240, and first, second and third coupling ribs 268, 263 and 265 to couple the plural rotor cores 220 and plural magnets 240 to the molded body 260.

Each of the first coupling ribs 268 forms a coupler, along with a corresponding one of the coupling grooves 224. The first coupling ribs 268 have a protrusion shape outwardly extending from an outer circumferential surface of the bridge 226 in the radial direction of the rotor 200. Each first coupling rib 268 includes a first inclined protrusion 268a inclinedly formed such that it has a width gradually decreasing as the first coupling rib 268 extends, and a second inclined protrusion 268b inclinedly formed while extending from the first inclined protrusion 268a such that it has a width gradually increasing while extending from the first inclined protrusion 268a.

The first inclined protrusion 268a of each first coupling rib 268 is received in the first groove portion 224a of the corresponding coupling groove 224 such that they engage with each other. Thus, the rotor core 200 and bridge 226 are coupled. In particular, the second inclined protrusion 268b of each first coupling rib 268 has a chock shape having a width gradually increasing in the circumferential direction of the rotor 200. Accordingly, the second inclined protrusions 268b effectively prevents the rotor core 220 from being separated from the bridge 226 due to centrifugal force generated during rotation of the rotor 200.

Each of the second coupling ribs 263 is received in a space 229 defined by the facing side surfaces of the neighboring rotor cores 220 corresponding to the second coupling rib 263 and one end of the magnet 240 disposed between the neighboring rotor cores 220 while contacting the first demagnetization preventing protrusions 232 respectively formed at the facing side surfaces of the neighboring rotor cores 220, not only to reinforce the rotor 200, but also to prevent the magnet 240 from being outwardly exposed.

Each of the third coupling ribs 265 is received in the through hole 222 provided at a corresponding one of the rotor cores 220 such that they engage with each other, to prevent the corresponding rotor core 220 from being separated from the bridge 226.

The first, second and third coupling ribs 268, 263, and 265 are formed to have shapes corresponding to those of the coupling groove 224, the space 229 defined by the rotor cores 220 and magnet 240, and the through hole 222, respectively, during an insert molding process in which the molded body 260 is integrated with the plural rotor cores 220 and plural magnets 240 while being injection-molded.

Figure 7:
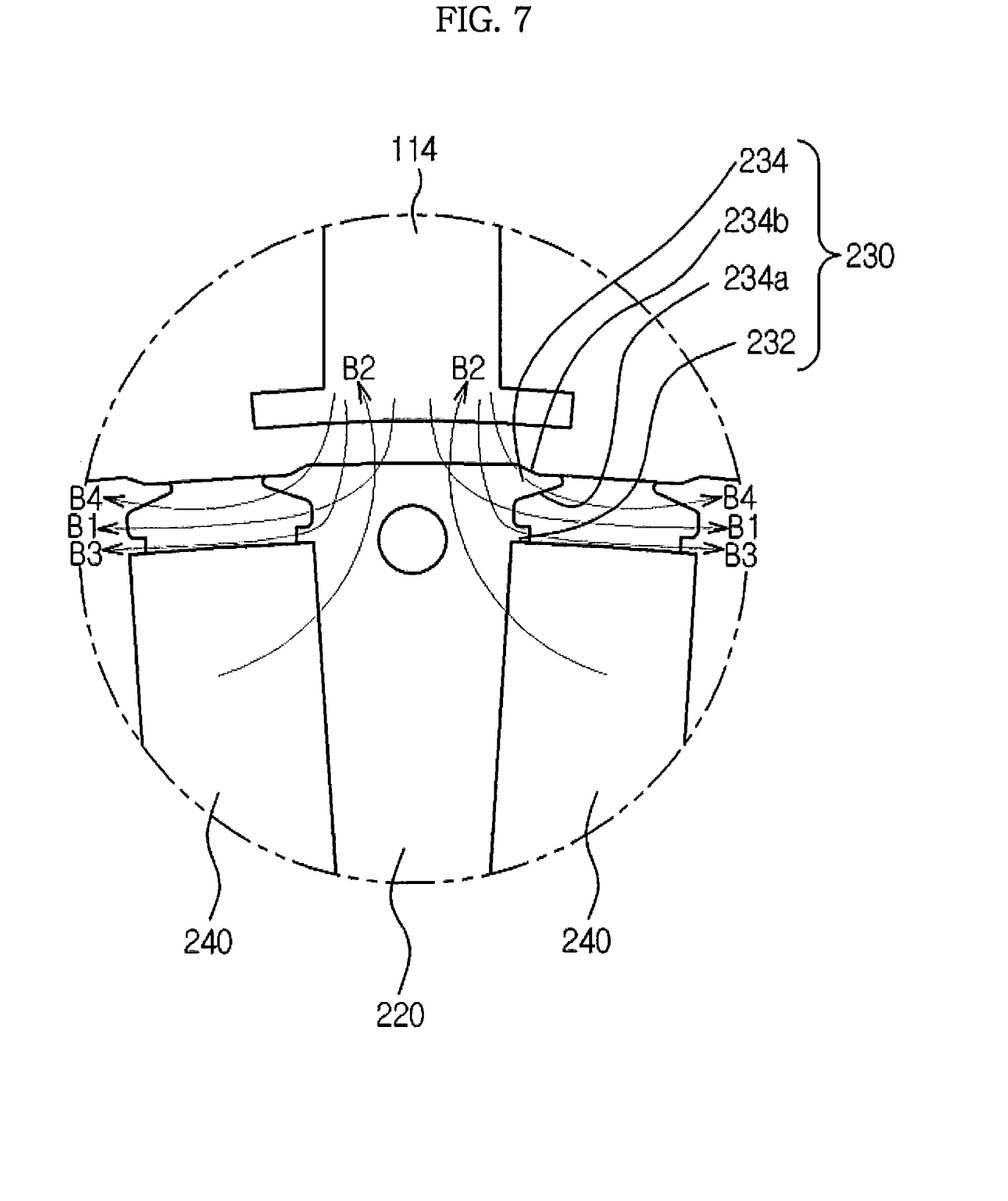
FIG. 7 is a view illustrating flows of magnetic flux between the rotor and a stator.

FIG. 7 is a view illustrating flows of magnetic flux between the rotor and the stator.

As shown in FIG. 7, magnetic flux B1 generated from the stator core 114 may flow in an opposite direction to magnetic flux B2 formed at the magnets 240.

The facing first magnetization preventing protrusions 232 contacting each magnet 240 regulate the clearance between the magnet 240 and the stator core 114, to reduce the influence of the magnetic flux B1 generated from the stator 100 on the magnetic flux B2 formed at the magnet 240.

The facing first demagnetization preventing protrusions 232, which extend from the facing side surfaces of the neighboring rotor cores 220, respectively, reduce the spacing between the neighboring rotor cores 220, to achieve easy establishment of a magnetic flux path B3 through the first demagnetization preventing protrusions 232, and thus to reduce influence of the magnetic flux B1 generated from the stator 100 on the magnetic flux B2 formed at the magnet 240.

The second demagnetization preventing protrusions 234 respectively provided at the outer ends 220a of the neighboring rotor cores 220 while facing each other regulate the circumferential spacing between the neighboring rotor cores 220, to achieve easy establishment of a magnetic flux path through the second demagnetization preventing protrusions 234, and thus to reduce influence of the magnetic flux B1 generated from the stator 100 on the magnetic flux B2 formed at the magnet 240.

The first inclined surface 234a of each second demagnetization preventing protrusion 234 guides magnetic flux generated from the stator core 114 to easily establish a magnetic flux path B4, along with the outer end 220a of the rotor core 220 positioned adjacent to the stator core 114, and thus to reduce influence of the magnetic flux on the corresponding magnet 240 via the second demagnetization preventing protrusion 234. The second inclined surface 234b of each second demagnetization preventing protrusion 234 disperses dense magnetic flux formed between the clearance between the corresponding rotor core 220 and the stator core 114 at the outer end of the rotor core 220, to reduce vibration of the stator 100 or rotor 200 generated due to electromagnetic excitation force caused by magnetic flux or noise generated due to such vibration.

Figure 8:
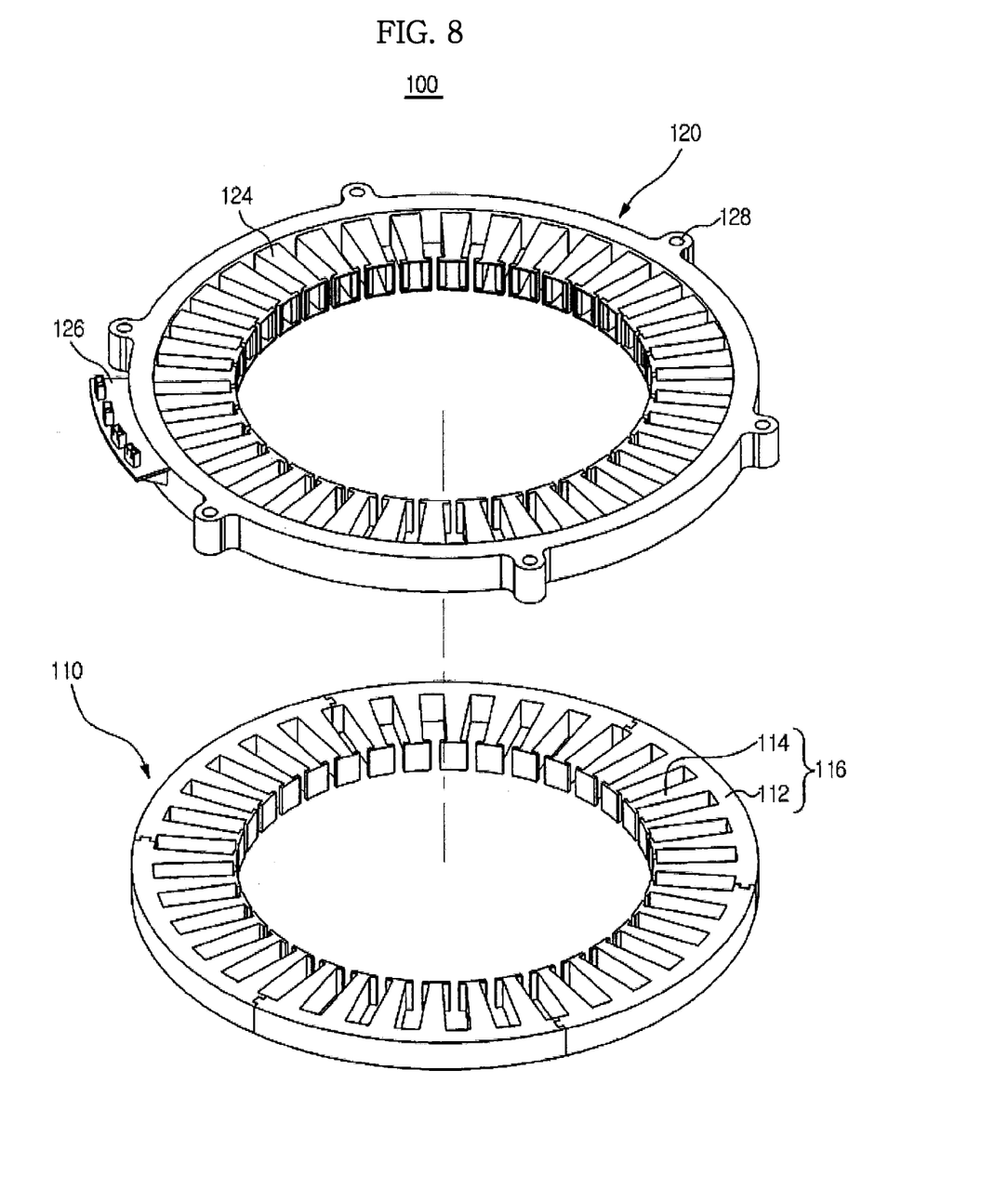
FIG. 8 is a perspective view illustrating the stator included in the motor according to the illustrated embodiment of the present disclosure.
Figure 9:
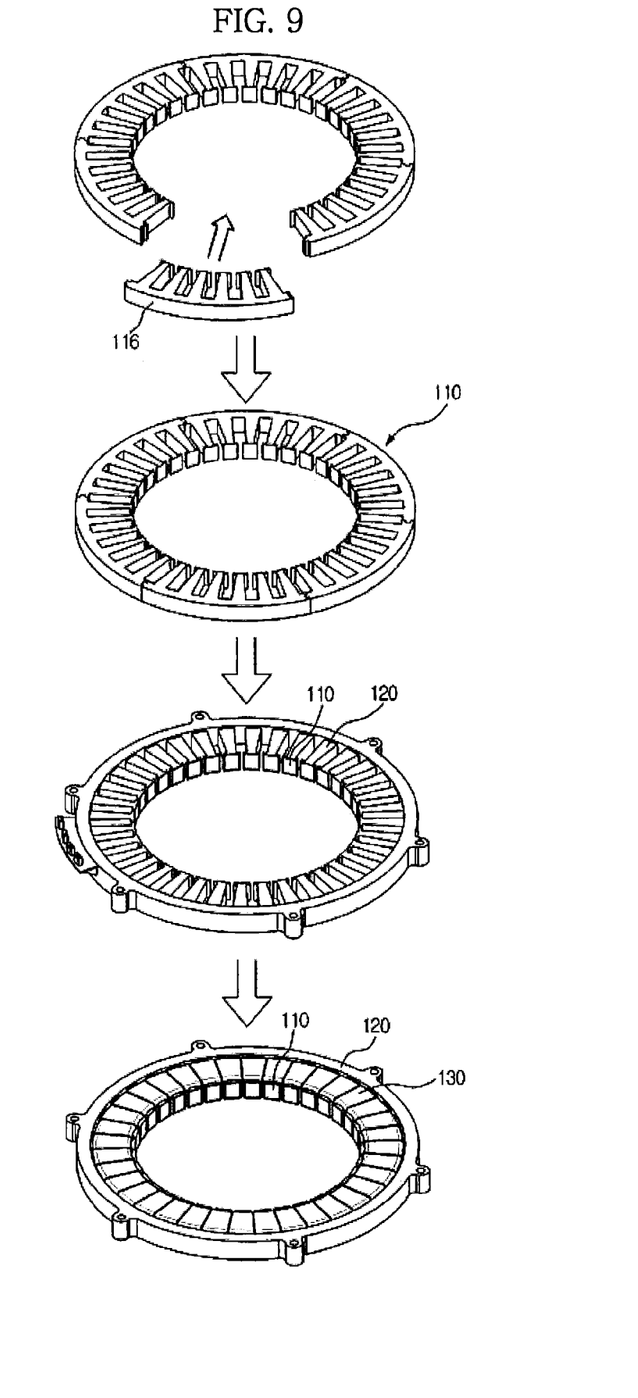
FIG. 9 is a view illustrating a procedure of manufacturing the stator in accordance with an exemplary embodiment of the present disclosure.

FIG. 8 is a perspective view illustrating the stator included in the motor according to the illustrated embodiment of the present disclosure. FIG. 9 is a view illustrating a procedure of manufacturing the stator in accordance with an exemplary embodiment of the present disclosure.

As shown in FIGS. 8 and 9, the stator, which is designated by reference numeral "100", includes a stator core assembly 110 constituted by a plurality of unit stator core assemblies 116. Each unit stator core assembly 116 includes a stator body 112 having an inner peripheral surface and an outer peripheral surface, and a plurality of stator cores 114 protruded from the inner peripheral surface of the stator body 112 in a radial manner in a direction toward a center of the stator 100. The stator 100 also includes an insulator 120 to enclose an outside of the stator core assembly 110, and coils 130 wound around coil winding portions 124 included in the insulator 120 to enclose the stator cores 114 of the stator core assembly 116. Each unit stator core assembly 116 may be formed by stacking pressed iron plates.

The insulator 120 is made of a material exhibiting electrical insulation. In addition to the coil winding portions 124, on which the coils 130 are wound, the insulator 120 includes a power supply 126 to supply power such that current flows through the coils 130 wound around the coil winding portions 124, and fastening holes 128 provided at a circumferential portion of the insulator 120, to enable the stator 100 to be fastened to the tub 20 of the washing machine 1. A fastening member (not shown) such as a pin, a rivet, or a bolt is inserted into each fastening hole 128, to fasten the stator 100 to the rear wall 21 of the tub 20.

The insulator 120 may be integrated with the stator core assembly 110 through an insert molding process.

The stator 100 is manufactured through the following procedure.

First, as shown in FIG. 9, the unit stator coil assemblies 116, each of which includes the stator body 112 and the plural stator cores 114, are coupled, to form the stator core assembly 110, which has a circular shape. Thereafter, the stator core assembly 110 is disposed within a mold, which is adapted to injection-mold the insulator 120.

After the stator core assembly 110 is disposed in the mold, a melted plastic material, which is a material of the insulator 120, is injected into the mold, to integrate the stator core assembly 110 and insulator 120.

Subsequently, the integrated stator core assembly 110 and insulator 120 are separated from the mold. Coils are then wound around the coil winding portions 124 of the insulator 120, to complete the stator 100.

As the insulator 120 is integrated with the stator core assembly 110 through an insert molding process, as described above, the strength of the stator 100 is enhanced. Also, it is unnecessary to use a process of separately assembling the insulator 120 to the stator core assembly 110. In addition, an element having a complicated shape such as a power supply may be integrated with the insulator 120 during the process of manufacturing the mold. Thus, freedom of design may be provided.

In accordance with the embodiments of the present disclosure, the rotor cores are prevented from being separated from the rotor during rotation of the rotor because the rotor cores are firmly coupled to the molded body.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A motor comprising:
    a stator comprising a plurality of stator cores arranged in a circumferential direction, and coils respectively wound around the stator cores; and
    a rotor rotatably arranged inside the stator,
    wherein the rotor comprises
        a plurality of rotor cores arranged in a circumferential direction of the rotor, each of the plurality of rotor cores including a coupling groove formed at an inner ends of the rotor core and a separation preventing hole,
        a plurality of magnets each disposed between neighboring ones of the rotor cores, and
        a molded body made of moldable plastic comprising
            a bridge to support the plurality of rotor cores and the plurality of magnets,
            first coupling ribs outwardly extending from an outer circumferential surface of the bridge in a radial direction of the rotor, each of the first coupling ribs being configured to be received by each of the coupling grooves,
            second coupling ribs extending in an axial direction of the rotor in a space defined by facing side surfaces of the neighboring ones of the rotor cores and one end of the magnet disposed between the neighboring ones of the rotor cores, each of the second coupling ribs being configured to reinforce the rotor and to prevent the magnet from being outwardly exposed, and
            third coupling ribs, each of the third coupling ribs being configured to be received by one of the separation preventing holes whereby the molded body is coupled to the rotor core, to prevent the rotor from being separated by centrifugal force during rotation of the rotor,
    wherein each of the rotor cores further comprises first protrusions respectively extending in the circumferential direction of the rotor from opposite side surfaces of the rotor core contacting corresponding ones of the magnets, and wherein facing ones of the first protrusions of the neighboring rotor cores contact one end of the magnet disposed between the neighboring rotor cores, to determine a position of the magnet in a direction in which a radius of the rotor increases.

2. The motor according to claim 1, wherein each of the first coupling ribs comprises:
   a first inclined protrusion inclinedly extending from the outer circumferential surface of the bridge while having a gradually-decreasing circumferential width; and
   a second inclined protrusion inclinedly extending from the first inclined protrusion while having a gradually-increasing circumferential width.

3. The motor according to claim 2, wherein each of the coupling grooves comprises:
   a first groove portion to receive the first inclined protrusion of a corresponding one of the first coupling ribs; and
   a second groove portion connected to the first groove portion, to receive the second inclined protrusion of the corresponding first coupling rib.

4. The motor according to claim 2, wherein each of the coupling grooves is centrally formed at the inner end of a corresponding one of the rotor cores.

5. The motor according to claim 1, wherein the separation preventing hole has a diameter of about 1.5 to 5 mm.

6. The motor according to claim 1, wherein each of the magnets extends in the axial direction of the rotor outwardly of upper and lower surfaces of the neighboring rotor cores, between which the magnet is disposed.

7. The motor according to claim 1, wherein each of the rotor cores further comprises second protrusions formed at an outer end of the rotor core defining a clearance, along with one end of a corresponding one of the stator cores, such that each of the second protrusions is disposed at a position farther from a center of the rotor than a corresponding one of the first protrusions, each of the second protrusions having an inclined surface to form an inclination angle with respect to the surface of the rotor core, from which the second protrusion extends, while extending in a direction farther from the center of the rotor.

8. The motor according to claim 7, wherein facing ones of the second protrusions of the neighboring rotor cores have a narrower spacing than a spacing between the first protrusions corresponding to the facing second protrusions.

* * * * *